(12) United States Patent
Mou et al.

(10) Patent No.: US 11,986,763 B2
(45) Date of Patent: May 21, 2024

(54) REMOTE CONTROL SYSTEM FOR GAS DETECTION AND PURIFICATION

(71) Applicant: Microjet Technology Co., Ltd., Hsinchu (TW)

(72) Inventors: Hao-Jan Mou, Hsinchu (TW); Yung-Lung Han, Hsinchu (TW); Chi-Feng Huang, Hsinchu (TW); Chun-Yi Kuo, Hsinchu (TW); Yang Ku, Hsinchu (TW); Chang-Yen Tsai, Hsinchu (TW); Wei-Ming Lee, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 820 days.

(21) Appl. No.: 17/107,036

(22) Filed: Nov. 30, 2020

(65) Prior Publication Data

US 2021/0205751 A1    Jul. 8, 2021

(30) Foreign Application Priority Data

Jan. 3, 2020  (TW) ................................. 109100200
Jan. 16, 2020  (TW) ................................. 109101603

(51) Int. Cl.
*B01D 46/42* (2006.01)
*B01D 46/44* (2006.01)
(Continued)

(52) U.S. Cl.
CPC ....... *B01D 46/429* (2013.01); *B01D 46/4263* (2013.01); *B01D 46/442* (2013.01);
(Continued)

(58) Field of Classification Search
CPC ....... B01D 46/429; B01D 46/44; F24F 11/30; F24F 11/56
See application file for complete search history.

(56) References Cited

U.S. PATENT DOCUMENTS 9,024,732 B2    5/2015    Huang et al.

FOREIGN PATENT DOCUMENTS

CN    101655689 A    *    2/2010
CN    202257926 U    *    5/2012
(Continued)

*Primary Examiner* — Sharon Pregler
(74) *Attorney, Agent, or Firm* — Birch, Stewart, Kolasch & Birch, LLP

(57) ABSTRACT

A remote control system for gas detection and purification is disclosed and includes a remote control device, a gas detection module and a gas purification device. The remote control device includes a gas inlet and a gas outlet. The gas detection module is disposed in the remote control device and in communication with the gas outlet to detect the gas located in an indoor space. The gas detection module provides and outputs a gas detection datum, and the remote control device transmits an operation command via wireless transmission. The gas purification device is disposed in the indoor space and receives the operating instruction transmitted from the remote control device to be operated. When the gas purification device is under the activated state, the gas in the indoor space is purified, and the purification operation mode of the gas purification device is adjusted according to the first gas detection datum.

19 Claims, 25 Drawing Sheets

(51) Int. Cl.
*B01D 46/46* (2006.01)
*F24F 11/30* (2018.01)
*F24F 11/56* (2018.01)
*G01N 15/0205* (2024.01)
*G01N 15/06* (2006.01)
*G01N 15/075* (2024.01)

(52) U.S. Cl.
CPC .............. *B01D 46/46* (2013.01); *F24F 11/30* (2018.01); *F24F 11/56* (2018.01); *G01N 15/0211* (2013.01); *G01N 15/06* (2013.01); *B01D 2279/50* (2013.01); *G01N 15/075* (2024.01)

(56) References Cited

FOREIGN PATENT DOCUMENTS

| | | |
|---|---|---|
| CN | 203464435 U | 3/2014 |
| CN | 205678830 U | 11/2016 |
| CN | 205807756 U | 12/2016 |
| CN | 107023943 B | 12/2019 |
| TW | 201713903 A | 4/2017 |
| TW | M576492 U | 4/2019 |

* cited by examiner

REMOTE CONTROL SYSTEM FOR GAS DETECTION AND PURIFICATION

FIELD OF THE INVENTION

The present disclosure relates to a remote control system for gas detection and purification, and more particularly to a remote control system implemented in an indoor space for gas detection and purification.

BACKGROUND OF THE INVENTION

In recent, people pay more and more attention to the quality of the air around their lives. For example, carbon monoxide, carbon dioxide, volatile organic compounds (VOC), PM2.5, nitric oxide, sulfur monoxide and even the suspended particles contained in the air are exposed in the environment to affect the human health, and even endanger the life seriously. Therefore, the quality of environmental air has attracted the attention of various countries. At present, how to detect the air quality and avoid the harm is a problem that urgently needs to be solved.

In order to confirm the quality of the air, it is feasible to use a gas sensor to detect the air surrounding in the environment. If the detection information is provided in real time to warn the people in the environment, it is helpful of avoiding the harm and facilitates the people to escape the hazard immediately. Thus, it prevents the hazardous gas exposed in the environment from affecting the human health and causing the harm. Therefore, it is a very good application to use a gas sensor to detect the air in the surrounding environment. Although modem people can utilize the gas sensor to detect the air quality of the surrounding environment, how to provide a purification solution to avoid breathing harmful gas is the most important problem in life.

Therefore, how to detect the air quality in real time, anytime, anywhere, and provide the benefits of purifying the air quality in the indoor space is a main subject developed in the present disclosure.

SUMMARY OF THE INVENTION

An object of the present disclosure provides a remote control system for gas detection and purification. By constructing a gas detection module on a remote control device, the user can carry it anytime and anywhere in an indoor space to detect the air quality around him At least one gas purification device installed in the indoor space is further combined and controlled by the remote control device. Gas detection datum of the surrounding air quality is detected by the remote control device, and an operating instruction is transmitted to the gas purification device through wireless transmission to execute an operation in an activated state and a closed state and a purification operation mode. Thus, the user can breathe clean air in the indoor space.

In accordance with an aspect of the present disclosure, a remote control system for gas detection and purification is provided and includes at least one remote control device, a first gas detection module and at least one gas purification device. The at least one remote control device includes at least one inlet and at least one outlet. The remote control device is capable of transmitting an operating instruction through wireless transmission. The first gas detection module is disposed within the remote control device and in communication with the inlet and the outlet, and configured to detect gas located in an indoor space where the remote control device is located. A first gas detection datum measured by the first gas detection module is provided and outputted to the remote control device, and the operating instruction and the first gas detection datum are transmitted by the remote control device. The at least one gas purification device is disposed in the indoor space and receives the operating instruction and the first gas detection datum from the remote control device, and configured to execute an operation in an activated state and a closed state. The gas in the indoor space is purified under the activated state, and the first gas detection datum is received to adjust a purification operation mode.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
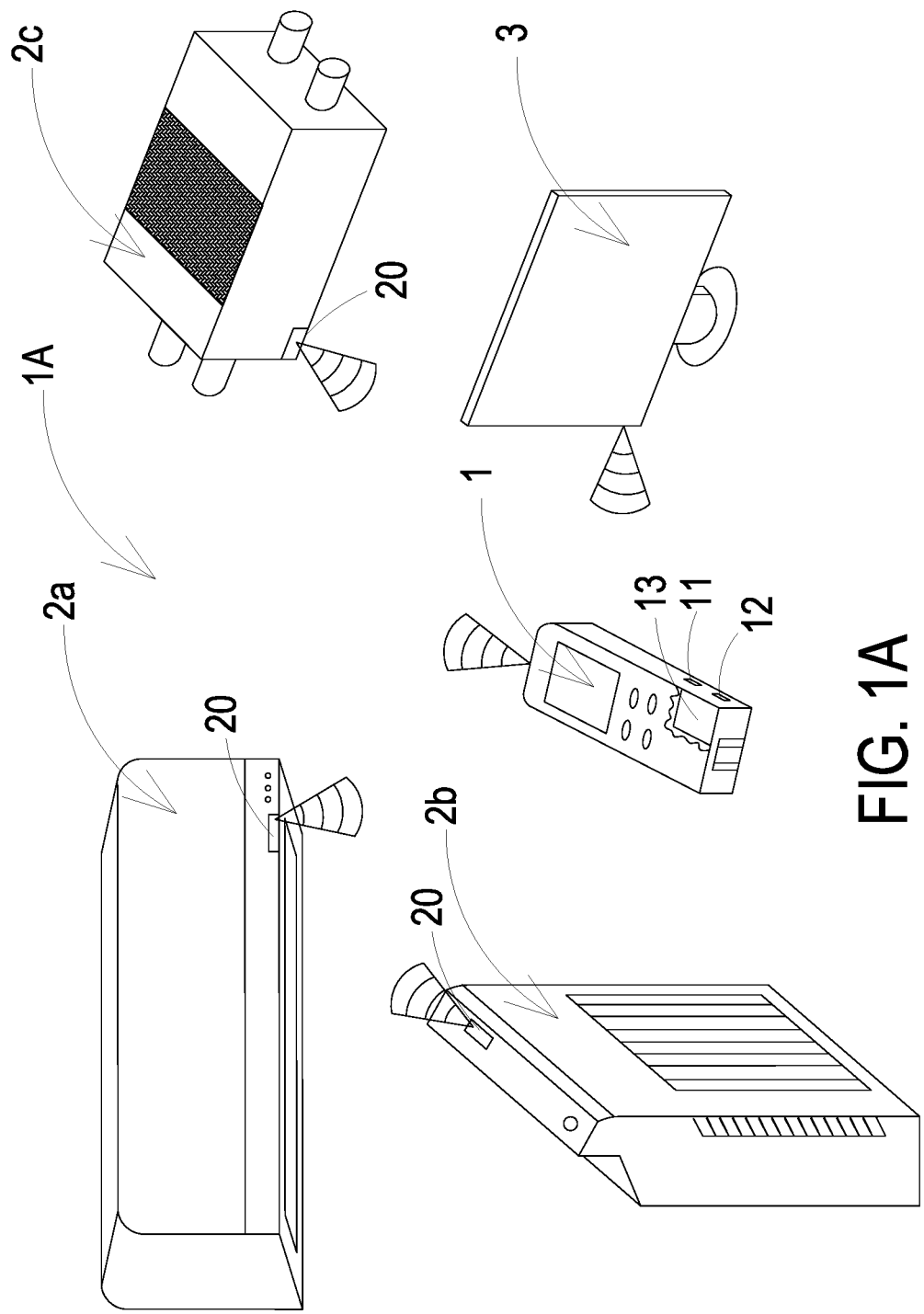
FIG. 1A is a schematic view illustrating a remote control system for gas detection and purification according to a first embodiment of the present disclosure.

Please refer to FIG. 1A. The present disclosure provides a remote control system for gas detection and purification including at least one remote control device 1 and at least one gas purification device. In the embodiment, there are one remote control device 1 and three gas purification devices 2a, 2b, 2c for illustration. The remote control device 1 transmits an operating instruction through wireless transmission to the three gas purification devices 2a, 2b, 2c located in an indoor space 1A, and the three gas purification devices 2a, 2b, 2c are configured to execute an operation in an activated state and a closed state. Preferably but not exclusively, the first gas purification device 2a is an air conditioner. Preferably but not exclusively, the second gas purification device 2b is a floor-standing air purifier. Preferably but not exclusively, the third gas purification device 2c is a total heat exchanger. Preferably but not exclusively, at least one of the three gas purification devices 2a, 2b, 2c is a fresh air ventilator.

Figure 1B:
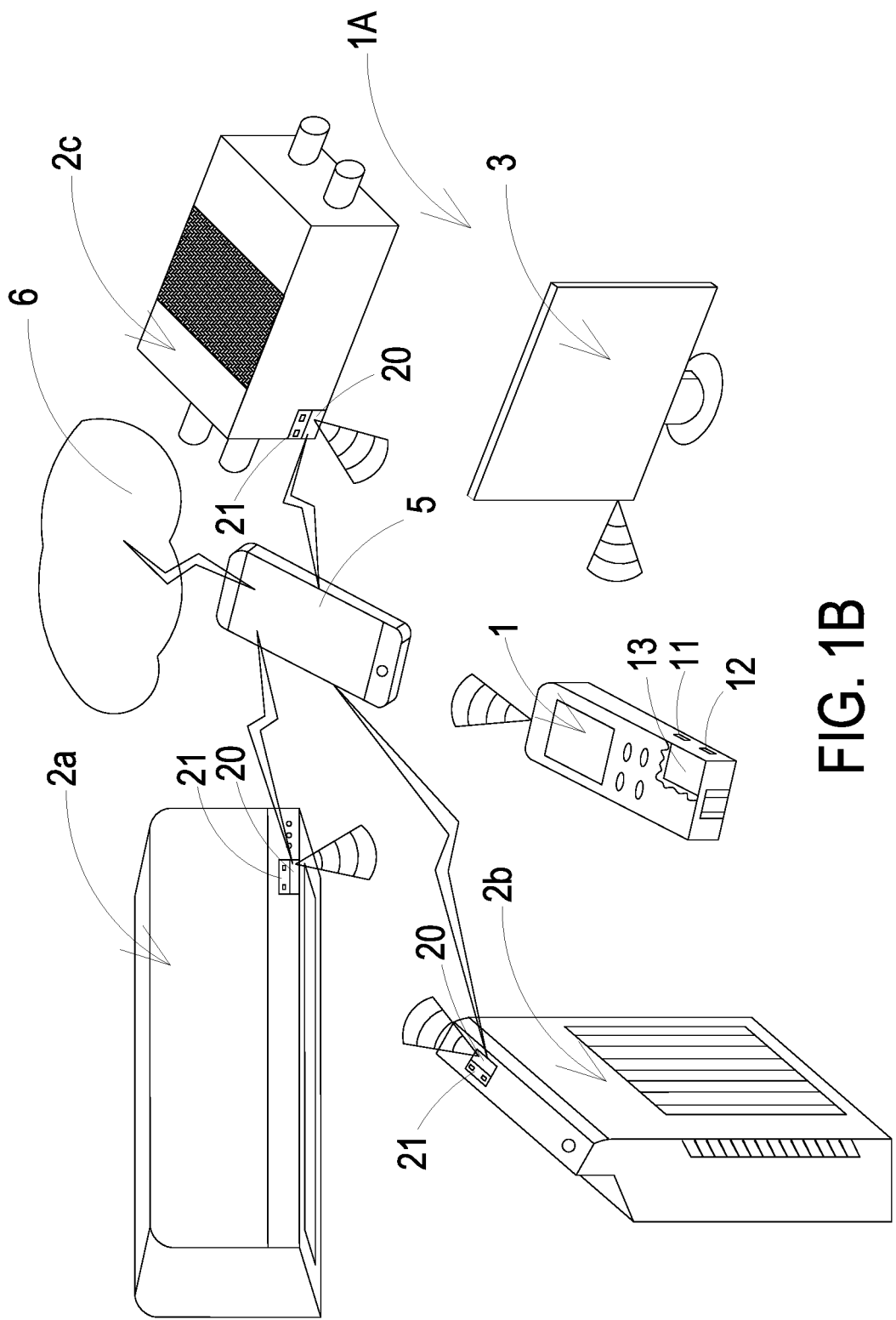
FIG. 1B is a schematic view illustrating a remote control system for gas detection and purification according to a second embodiment of the present disclosure.

In the embodiment, the remote control device 1 includes at least one inlet 11, at least one outlet 12 and a first gas detection module 13. As shown in FIG. 1A, the first gas detection module 13 is disposed within the remote control device 1 and in communication with the inlet 11 and the outlet 12. The first gas detection module 13 is configured to detect gas located in the indoor space 1A where the remote control device 1 is located. A first gas detection datum measured by the first gas detection module 13 is provided and outputted to the remote control device 1. The remote control device 1 transmits an operating instruction through wireless transmission to the gas purification devices 2a, 2b, 2c. Preferably but not exclusively, the wireless communication transmission is one selected from the group consisting of an infrared transmission, a radio frequency identification transmission, Wi-Fi transmission, Bluetooth transmission and a near field communication (NFC) transmission. In the embodiment, the operating instruction includes driving signals of the gas purification devices 2a, 2b, 2c and the first gas detection datum detected and outputted by the first gas detection module 13. Moreover, as shown in FIG. 1A and FIG. 1G, the gas purification devices 2a, 2b, 2c includes an intelligent switch 20, respectively. The intelligent switch 20 includes a second communicator 20a and a control unit 20b. The second communicator 22a receives the operating instruction and the first gas detection datum transmitted by the remote control device 1 through wireless transmission. The control unit 20b processes the operating instruction and the first gas detection datum received by the second communicator 20a, to control the gas purification devices 2a, 2b, 2c to execute the operation in the activated state and the closed state and the purification operation mode. In that, the gas purification devices 2a, 2b, 2c receive the operating instruction to actuate the gas purification devices 2a, 2b, 2c under the activated state, so that the gas in the indoor space 1A is purified, and the first gas detection datum is received to adjust the purification operation mode. For example, when the gas purification devices 2a, 2b, 2c receive the first gas detection datum with the warning issued, the gas purification devices 2a, 2b, 2c adjust the purification operation mode to increase the flow rate and increase the operating time until the gas purification devices 2a, 2b, 2c filter the imported gas to achieve the purification effect. When the first gas detection datum detected by the first gas detection module 13 becomes to fit the safe range, the gas purification devices 2a, 2b, 2c are switched to stop the operations.

Figure 1C:
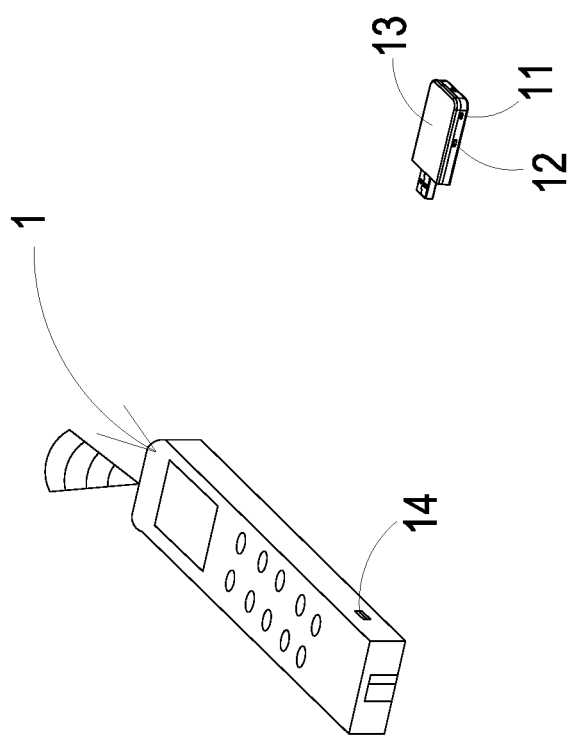
FIG. 1C is a schematic view illustrating a related configuration of the remote control system for gas detection and purification according to the first embodiment of the present disclosure, which is implemented by using an external gas detection module.
Figure 1D:
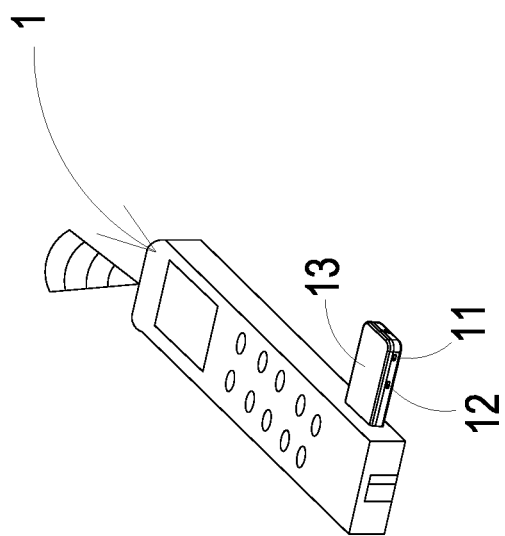
FIG. 1D is a schematic view illustrating the remote control system for gas detection and purification according to the first embodiment of the present disclosure, which has the external gas detection module combined.
Figure 1E:
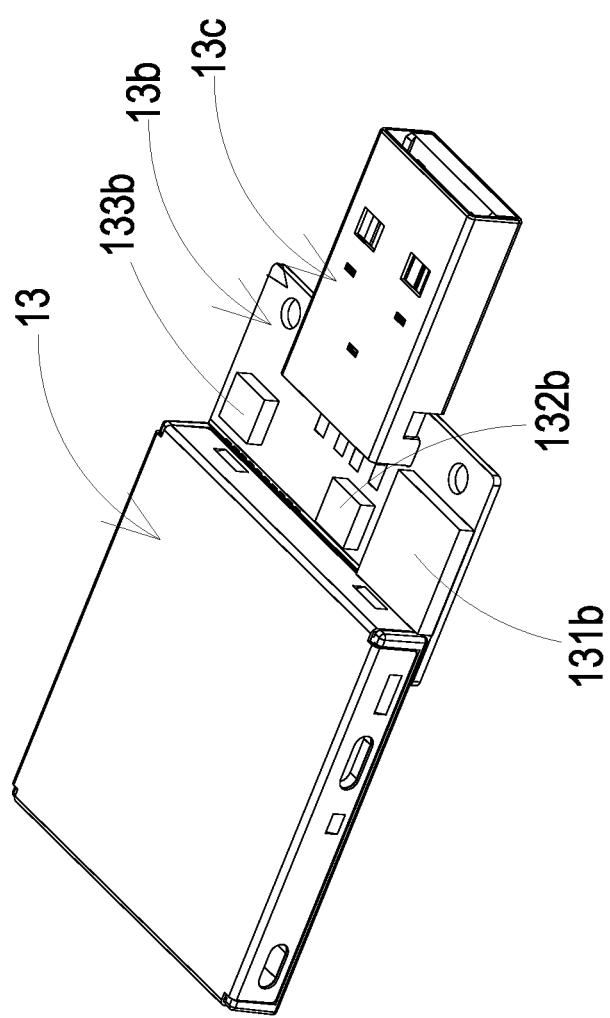
FIG. 1E is a schematic view illustrating related components of the remote control system for gas detection and purification according to the first embodiment of the present disclosure, which is implemented by using the external gas detection module.
Figure 1F:
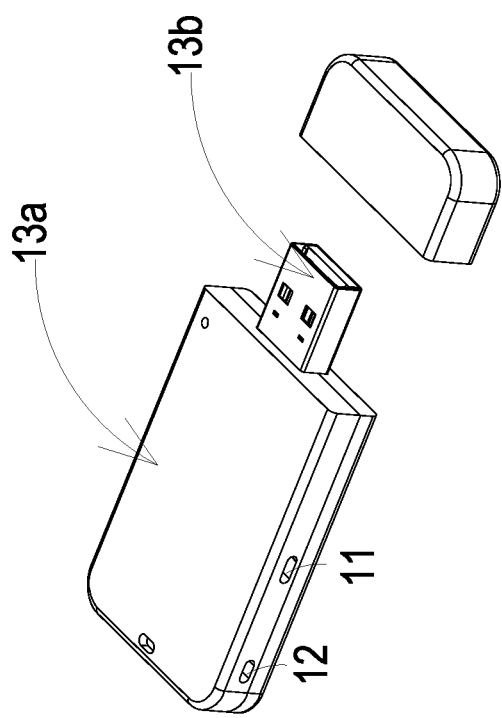
FIG. 1F is a schematic exterior view illustrating the remote control system for gas detection and purification according to the first embodiment of the present disclosure, which is implemented by using the external gas detection module.
Figure 1G:
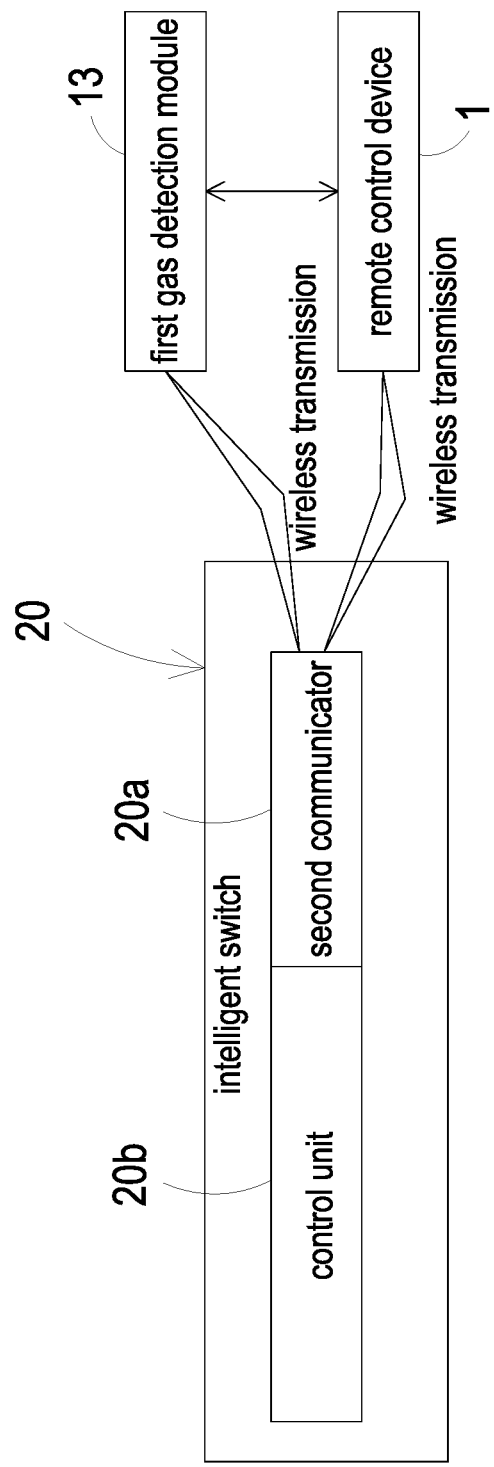
FIG. 1G is a block diagram illustrating the remote control system for gas detection and purification according to the first embodiment of the present disclosure, which is implemented by using the external gas detection module.
Figure 1H:
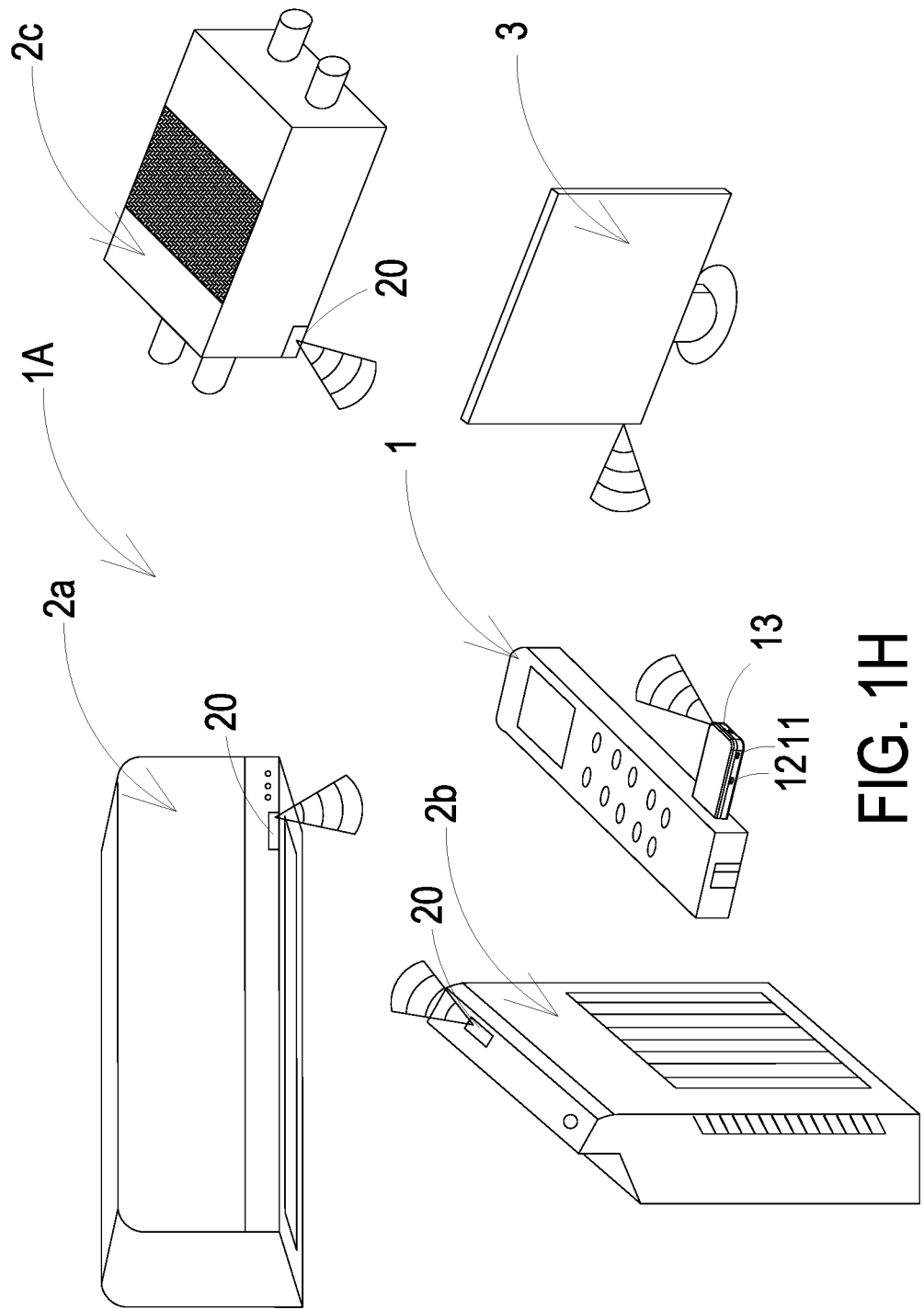
FIG. 1H is a schematic view illustrating an intelligent switch connected with the external gas detection module in the remote control system for gas detection and purification according to the present disclosure.

Please refer to FIGS. 1C to 1F. The present disclosure provides a remote control system for gas detection and purification including at least one remote control device 1 and at least one gas purification device. In the embodiment, a first gas detection module 13 is disposed on the remote control device 1. Preferably but not exclusively, the first gas detection module 13 is an external gas detection module 13, which is detachably connected to the remote control device 1 instead of being assembled inside the remote control device 1. As shown in FIG. 1C, the remote control device 1 includes an external port 14 for allowing an external device to transmit signals to the remote control device 1. Furthermore, as shown in FIGS. 1E, 1F and 1H, the external gas detection module includes a housing 13a, a first gas detection module 13, a control unit 13b and an external connection device 13c. The housing 13a includes at least one inlet 11 and at least one outlet 12. The first gas detection module 13 is disposed in the housing 13a and in communication with the inlet 11 and the outlet 13, so as to detect gas introduced from the exterior of the housing 13a and obtain a first gas detection datum. The control unit 13b includes a microprocessor 131b, a first communicator 132b and a power module 133b integrally packaged into one piece and electrically connected to each other. In the embodiment, the power module 133b wirelessly transmits, receives and stores electrical energy through a power supply device (not shown), so as to provide the microprocessor 131b for operation. The microprocessor 131b receives a first gas detection signal of the first gas detection module 13, which is processed and converted into the first gas detection datum. The first communicator 132b is used to receive the first gas detection datum outputted from the microprocessor 131b and transmit the operating instruction and the first gas detection datum to the second communicators 20a of the intelligent switches 20 of the gas purification devices 2a, 2b, 2c through communication transmission, respectively. In that, each of the second communicators 20a receives the operating instruction and the first gas detection datum transmitted from the first communicator 132b through the wireless transmission. The control units 20b process the operating instruction received by the corresponding second communicators 20a to control the gas purification devices 2a, 2b, 2c to execute the operation in the activated state and the closed state and the purification operation mode. In the embodiment, the external connection device 13c is integrally packaged on the control unit 13b and electrically connected to each other. The first gas detection module 13, the control unit 13b and the external connection device 13c are covered by the housing 13a for protection. Preferably but not exclusively, the external connection device 13c is partially exposed outside the housing 13a for electrically connecting to the external port 14 of the remote control device 1. In the embodiment, an external power is provided and connected to the microprocessor 131b to actuate the first gas detection module 13, and the gas in the indoor space 1A where the remote control device 1 is located is detected. Furthermore, the first communicator 132b outputs the first gas detection datum to the second communicator 20a of the intelligent switch 20 in each of the gas purification devices 2a, 2b, 2c. In that, each of the gas purification devices 2a, 2b, 2c receives the operating instruction and the first gas detection datum to execute the operation in the activated state and the closed state. Preferably but not exclusively, the gas in the indoor space 1A is purified under the activated state, and the first gas detection datum is received to adjust the purification operation mode.

FIG. 1B is a schematic view illustrating a remote control system for gas detection and purification according to a second embodiment of the present disclosure. Different from the remote control system of the first embodiment, in the embodiment, each of the gas purification devices 2a, 2b, 2c further includes a second gas detection module 21. The second gas detection module 21 detects gas located in a place where the corresponding one of the gas purification devices 2a, 2b, 2c is located, and provides a second gas detection datum. In that, there are a plurality of gas detection modules added in the indoor space 1A for detecting the air quality. It facilitates the user in the indoor space 1A to know whether a purification effect of the breathing air has been achieved. In that, the second gas detection datum detected and outputted by the second gas detection module 21 of the corresponding one of the gas purification devices 2a, 2b, 2c is transmitted to an external connection device 5 by the corresponding intelligent switch 20 through wireless transmission. Preferably but not exclusively, the external connection device 5 is capable of transmitting the second gas detection datum to a cloud device 6 for storing thereof and generating gas detection information and an alarm. In an embodiment, the external connection device 5 transmits the second gas detection datum detected and outputted by the second gas detection module 21 to a screen device 3. The screen device 3 receives the second gas detection datum to display the second gas detection datum informing the air quality in the indoor space 1A. Preferably but not exclusively, the external connection device 5 is a portable mobile device.

Figure 8A:
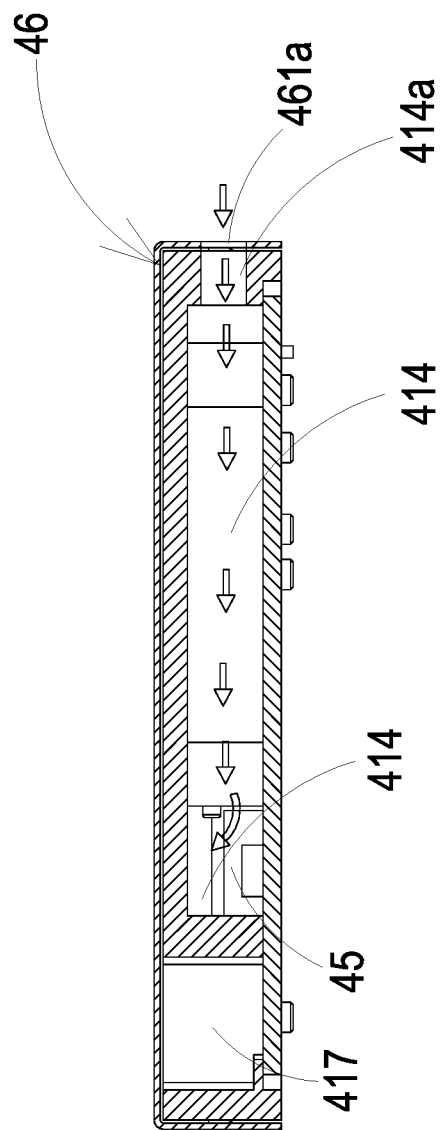
FIGS. 8A to 8C schematically illustrate gas flowing paths of the gas detection module of the present disclosure.

In the above embodiments, the second gas detection module 21 has a gas detection module structure 4 similar to that of the first gas detection module 13. Please refer to FIGS. 2A to 2C. In the embodiment, the gas detection module structure 4 includes a base 41, a piezoelectric actuator 42, a driving circuit board 43, a laser component 44, a particulate sensor 45 and an outer cover 46. The base 41 includes a first surface 411, a second surface 412, a laser loading region 413, a gas-inlet groove 414, a gas-guiding-component loading region 415 and a gas-outlet groove 416. In the embodiment, the first surface 411 and the second surface 412 are two surfaces opposite to each other. In the embodiment, the laser loading region 413 is hollowed out from the first surface 411 to the second surface 412. The gas-inlet groove 414 is concavely formed from the second surface 412 and disposed adjacent to the laser loading region 413. The gas-inlet groove 414 includes a gas-inlet 414a and two lateral walls. The gas-inlet 414a is in communication with an environment outside the base 41, and spatially corresponds to an inlet opening 461a of the outer cover 46. A transparent window 414b is opened on the two lateral walls and is in communication with the laser loading region 413. Therefore, the first surface 411 of the base 41 is covered and attached by the outer cover 46, and the second surface 412 is covered and attached by the driving circuit board 43. Thus, the gas-inlet groove 414 defines an inlet path, as shown in FIG. 4 and FIG. 8A.

Figure 3A:
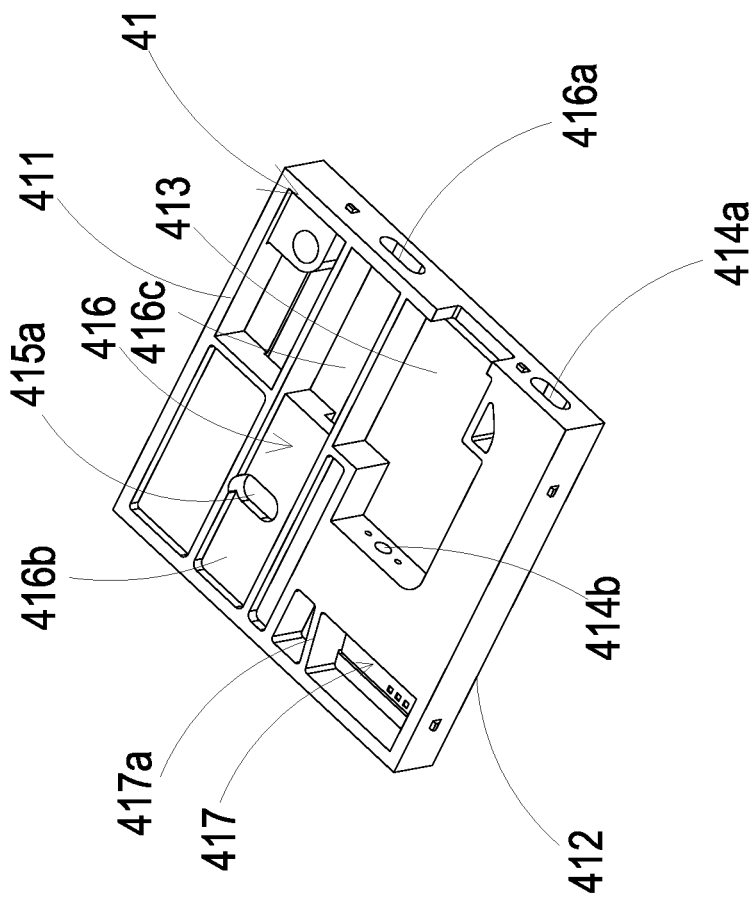
FIG. 3A is a schematic perspective view illustrating a base of the gas detection module of the present disclosure.
Figure 3B:
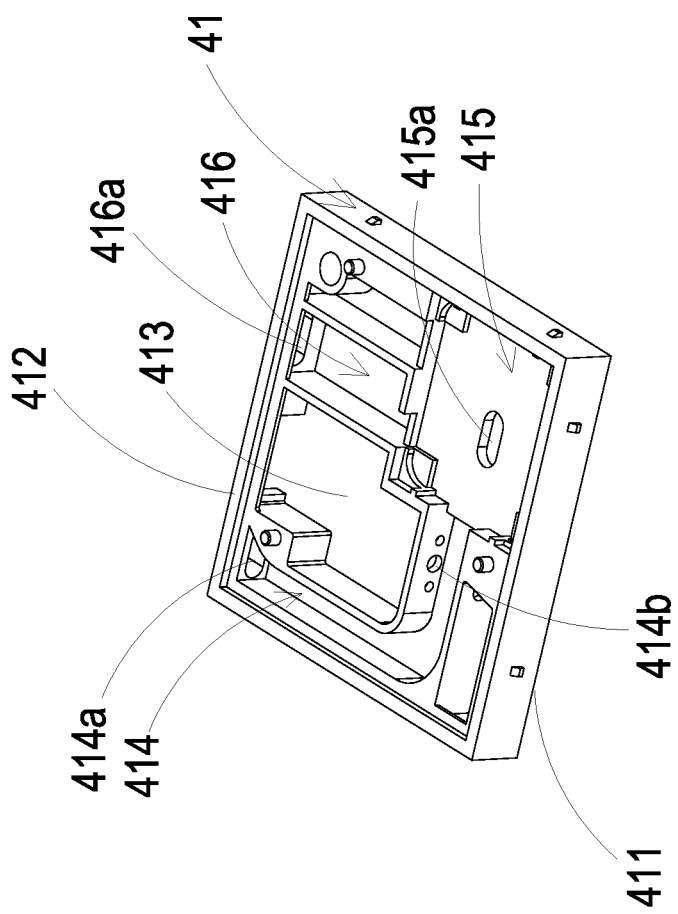
FIG. 3B is a schematic perspective view illustrating the base of the gas detection module of the present disclosure and taken from another perspective angle.
Figure 8B:
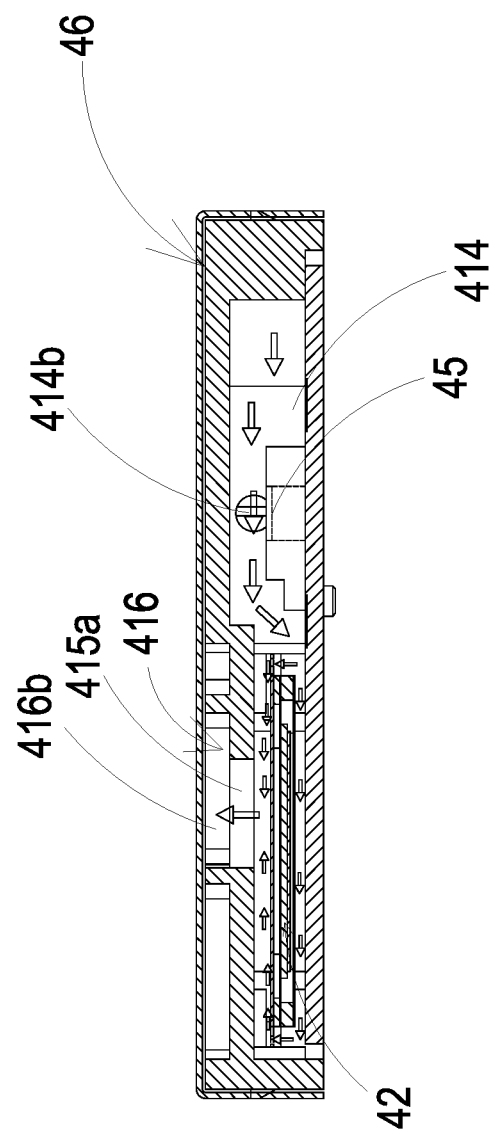
Figure 8C:
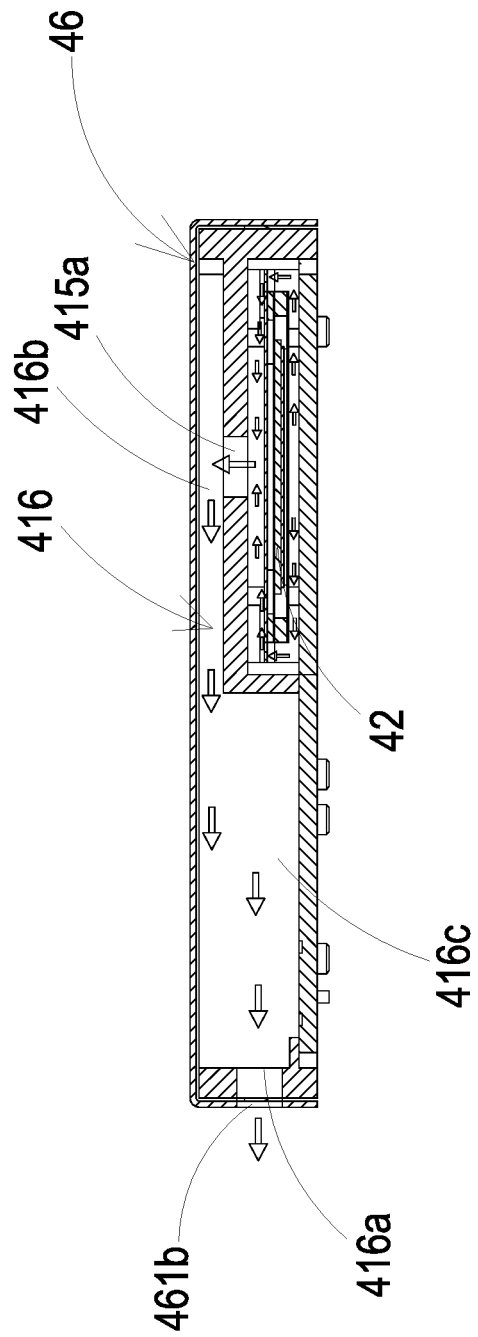

Please refer to FIGS. 3A and 3B. In the embodiment, the gas-guiding-component loading region 415 is concavely formed from the second surface 412 and in fluid communication with the gas-inlet groove 414. A ventilation hole 415a penetrates a bottom surface of the gas-guiding-component loading region 415. In the embodiment, the gas-outlet groove 416 includes a gas-outlet 416a, and the gas-outlet 416a spatially corresponds to the outlet opening 461b of the outer cover 46. The gas-outlet groove 416 includes a first section 416b and a second section 416c. The first section 416b is hollowed out from the first surface 411 to the second surface 412 in a vertical projection area of the gas-guiding-component loading region 415 spatially corresponding thereto. The second section 416c is hollowed out from the first surface 411 to the second surface 412 in a region where the first surface 411 is not aligned with the vertical projection area of the gas-guiding-component loading region 415 and extended therefrom. The first section 416b and the second section 416c are connected to form a stepped structure. Moreover, the first section 416b of the gas-outlet groove 416 is in communication with the ventilation hole 415a of the gas-guiding-component loading region 415, and the second section 416c of the gas-outlet groove 416 is in fluid communication with the gas-outlet 416a. In that, when first surface 411 of the base 41 is attached and covered by the outer cover 46, and the second surface 412 of the base 1 is attached and covered by the driving circuit board 43, the gas-outlet groove 416 defines an outlet path, as shown in FIGS. 8B and 8C.

Figure 2A:
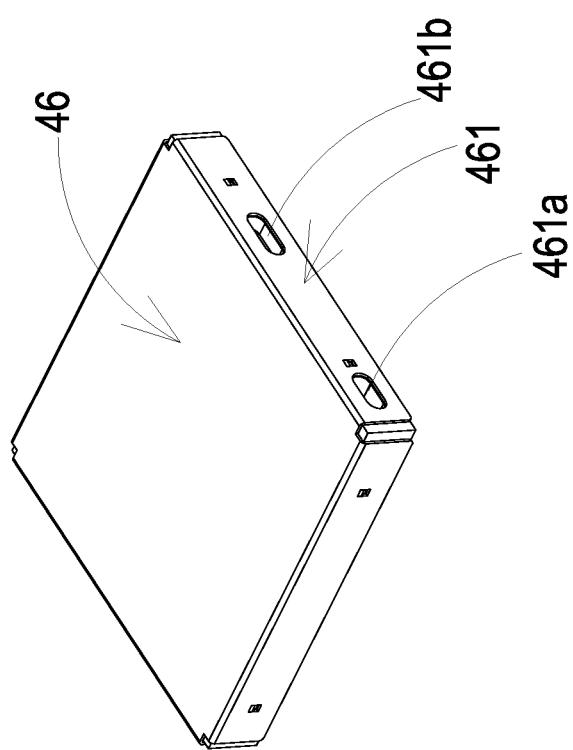
FIG. 2A is schematic exterior view illustrating a gas detection module according to an embodiment of the present disclosure.
Figure 2B:
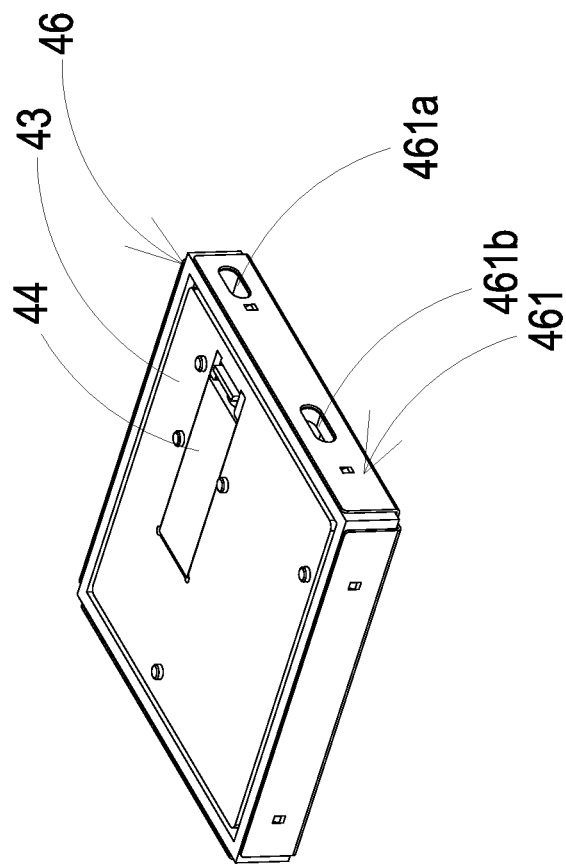
FIG. 2B is a schematic exterior view illustrating the gas detection module according to the embodiment of the present disclosure and taken from another perspective angle.
Figure 2C:
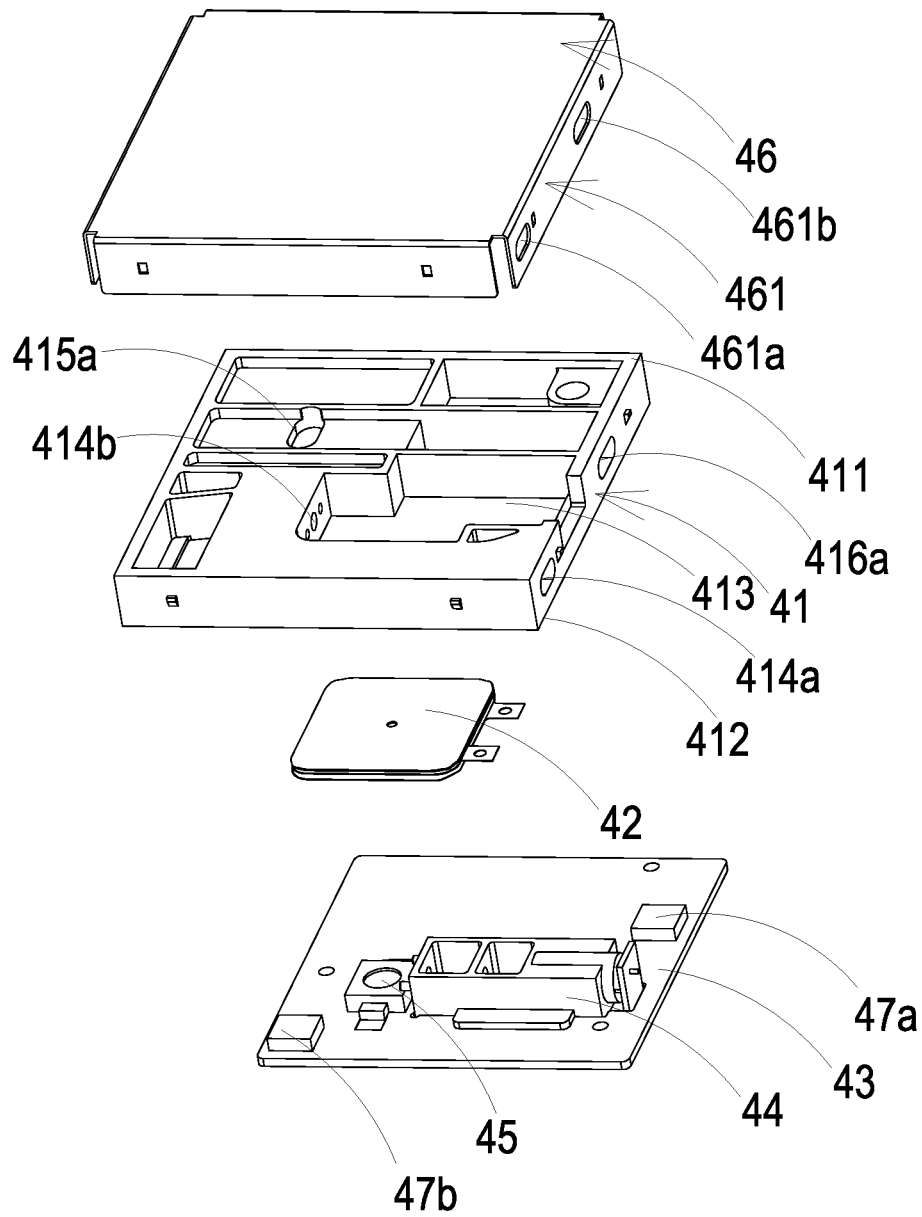
FIG. 2C is a schematic exploded view illustrating the gas detection module of the present disclosure.
Figure 4:
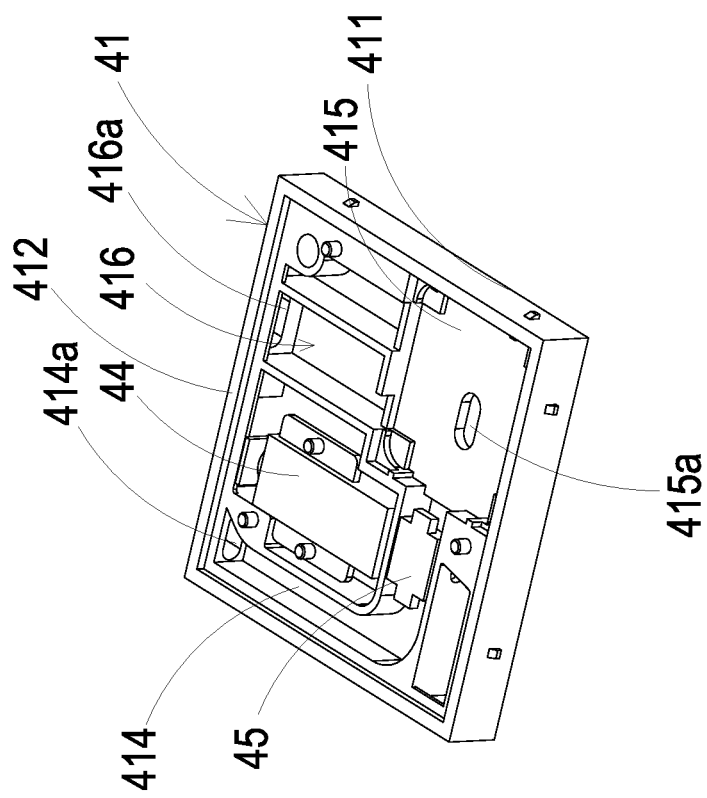
FIG. 4 is a schematic perspective view illustrating a laser component and a particulate sensor accommodated in the base of the present disclosure.

Please refer to FIG. 2C and FIG. 4. In the embodiment, the laser component 44 and the particulate sensor 45 are disposed on the driving circuit board 43 and accommodated in the base 41. In order to describe the positions of the laser component 44 and the particulate sensor 45 in the base 41, the driving circuit board 43 is specifically omitted in FIG. 4 to explain clearly. Please refer to FIG. 2C, FIG. 3B, FIG. 4 and FIG. 9. In the embodiment, the laser component 44 is accommodated in the laser loading region 413 of the base 41, and the particulate sensor 45 is accommodated in the gas-inlet groove 414 of the base 41 and aligned to the laser component 44. In addition, the laser component 44 spatially corresponds to the transparent window 414b, a light beam emitted by the laser component 44 passes through the transparent window 414b and is irradiated into the gas-inlet groove 414. A light beam path emitted from the laser component 44 passes through the transparent window 414b and extends in a direction perpendicular to the gas-inlet groove 414, thereby forming an orthogonal direction with the gas-inlet groove 414. In the embodiment, a projecting light beam emitted from the laser component 44 passes through the transparent window 414b and enters the gas-inlet groove 414, and suspended particles contained in the gas passing through the gas-inlet groove 414 is irradiated by the projecting light beam. When the suspended particles contained in the gas are irradiated to generate scattered light spots, the scattered light spots are received and calculated by the particulate sensor 45 for obtaining related information about the sizes and the concentration of the suspended particles contained in the gas. In the embodiment, the particulate sensor 45 is a PM2.5 sensor.

Figure 5A:
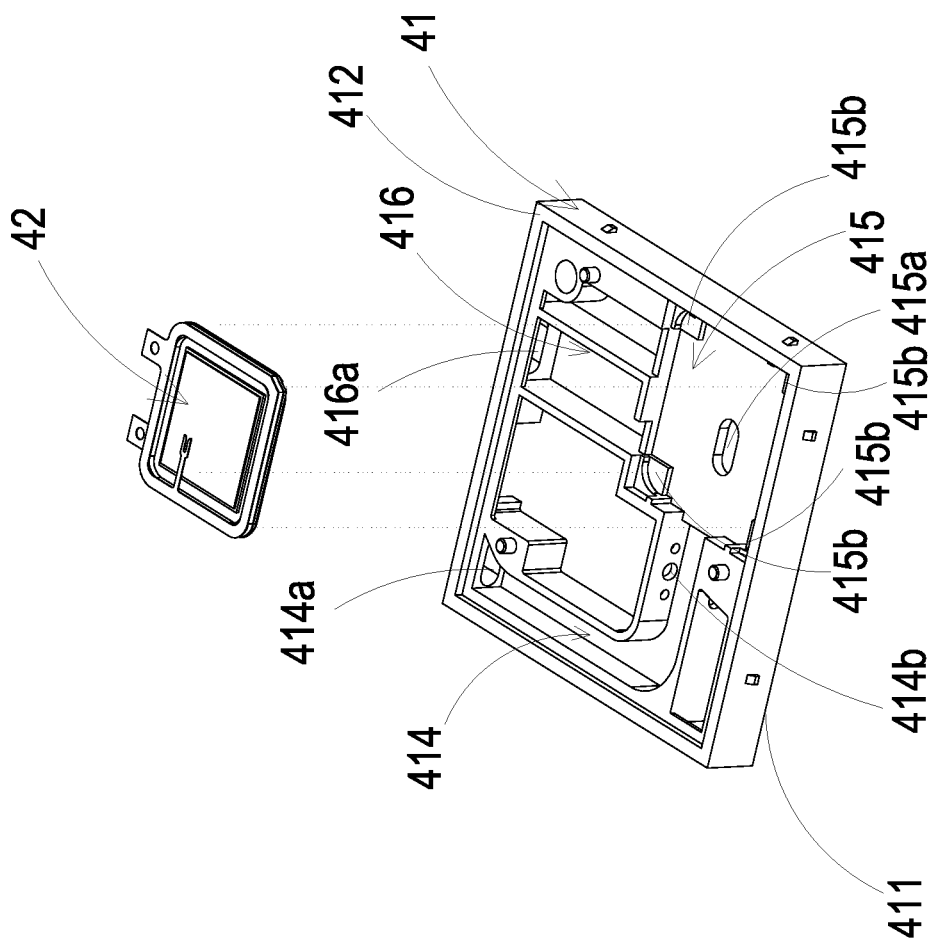
FIG. 5A is a schematic exploded view illustrating the combination of the piezoelectric actuator and the base according to the present disclosure.
Figure 5B:
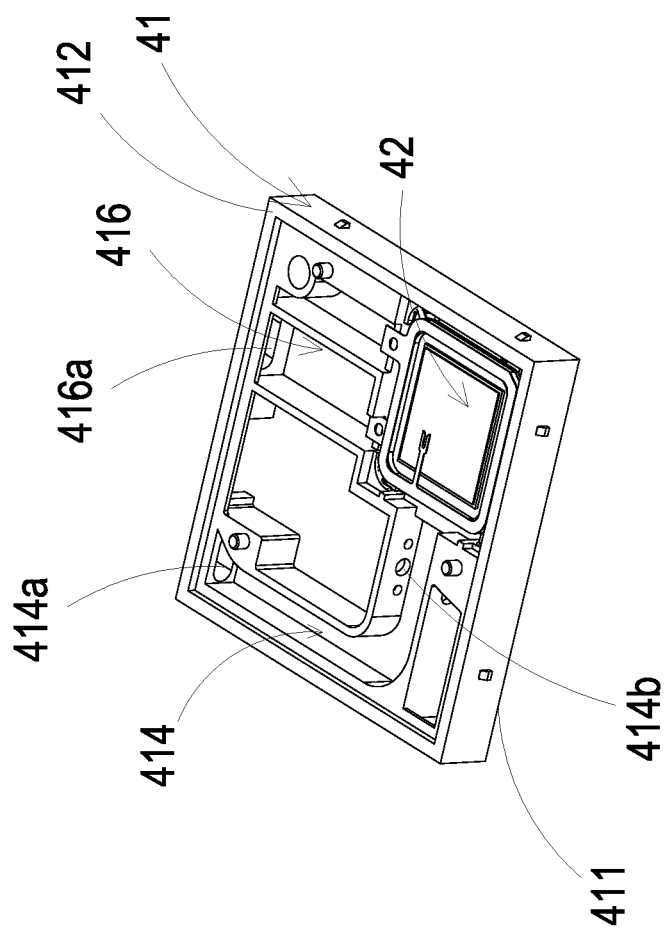
FIG. 5B is a schematic perspective view illustrating the combination of the piezoelectric actuator and the base according to the present disclosure.

Please refer to FIG. 5A and FIG. 5B. The piezoelectric actuator 42 is accommodated in the gas-guiding-component loading region 415 of the base 41. Preferably but not exclusively, the gas-guiding-component loading region 415 is square and includes four positioning protrusions 145b disposed at four corners of the gas-guiding-component loading region 415, respectively. The piezoelectric actuator 42 is disposed in the gas-guiding-component loading region 415 through the four positioning protrusions 415b. In addition, as shown in FIGS. 3A, 3B, 8B and 8C, the gas-guiding-component loading region 415 is in communication with the gas-inlet groove 414. When the piezoelectric actuator 42 is enabled, the gas in the gas-inlet groove 414 is inhaled by the piezoelectric actuator 42, so that the gas flows into the piezoelectric actuator 42. Furthermore, the gas is transported into the gas-outlet groove 416 through the ventilation hole 415a of the gas-guiding-component loading region 415.

Please refer to FIGS. 2A and 2B. In the embodiment, the driving circuit board 43 covers and is attached to the second surface 412 of the base 41, and the laser component 44 is positioned and disposed on the driving circuit board 43, and is electrically connected to the driving circuit board 43. The particulate sensor 45 is positioned and disposed on the driving circuit board 43, and is electrically connected to the driving circuit board 43. The outer cover 46 covers the base 41 and is attached to the first surface 411 of the base 41. Moreover, the outer cover 46 includes a side plate 461. The side plate 461 has an inlet opening 461a and an outlet opening 461b. When the outer cover 46 covers the base 41, the inlet opening 461a spatially corresponds to the gas-inlet 414a of the base 41 (as shown in FIG. 8A), and the outlet opening 461b spatially corresponds to the gas-outlet 416a of the base 41 (as shown in FIG. 8C).

Figure 6A:
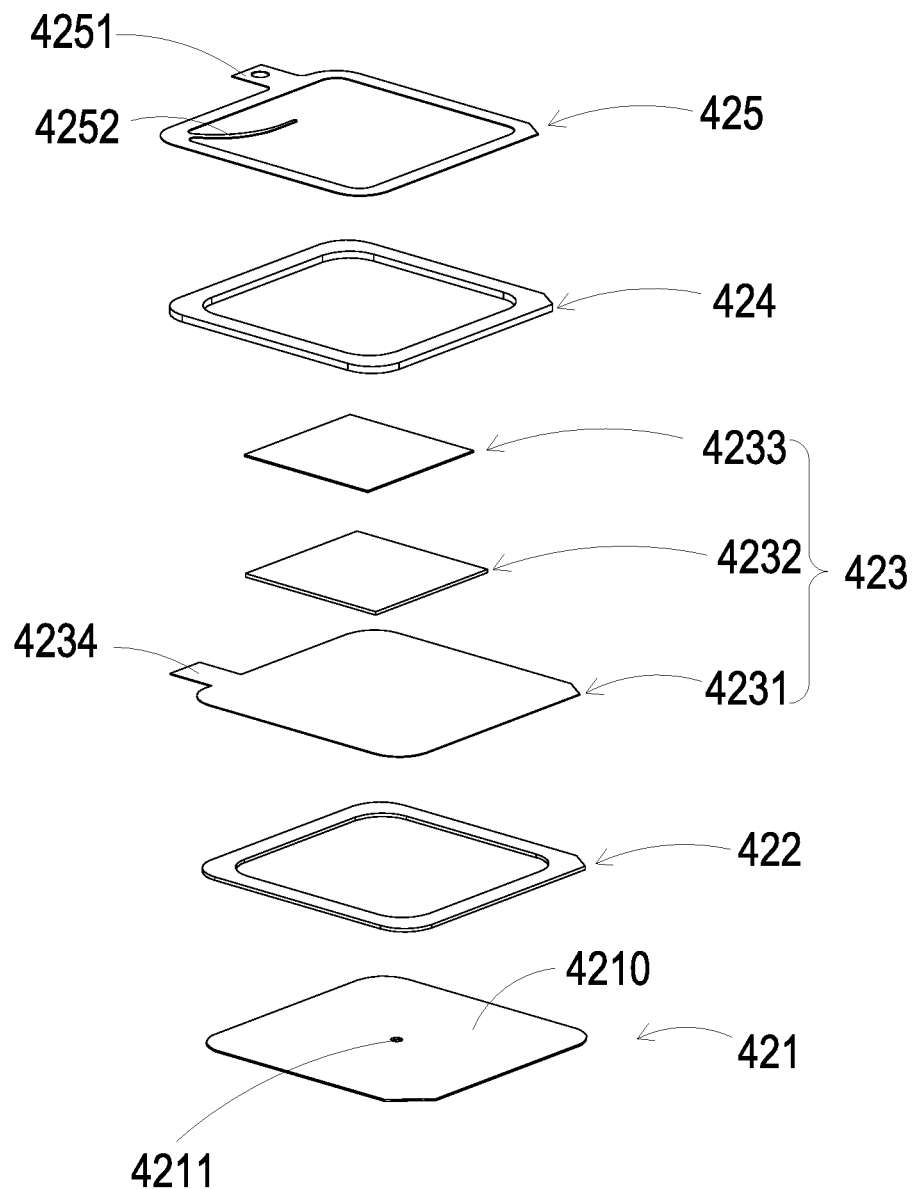
FIG. 6A is a schematic exploded view illustrating the piezoelectric actuator of the present disclosure.
Figure 6B:
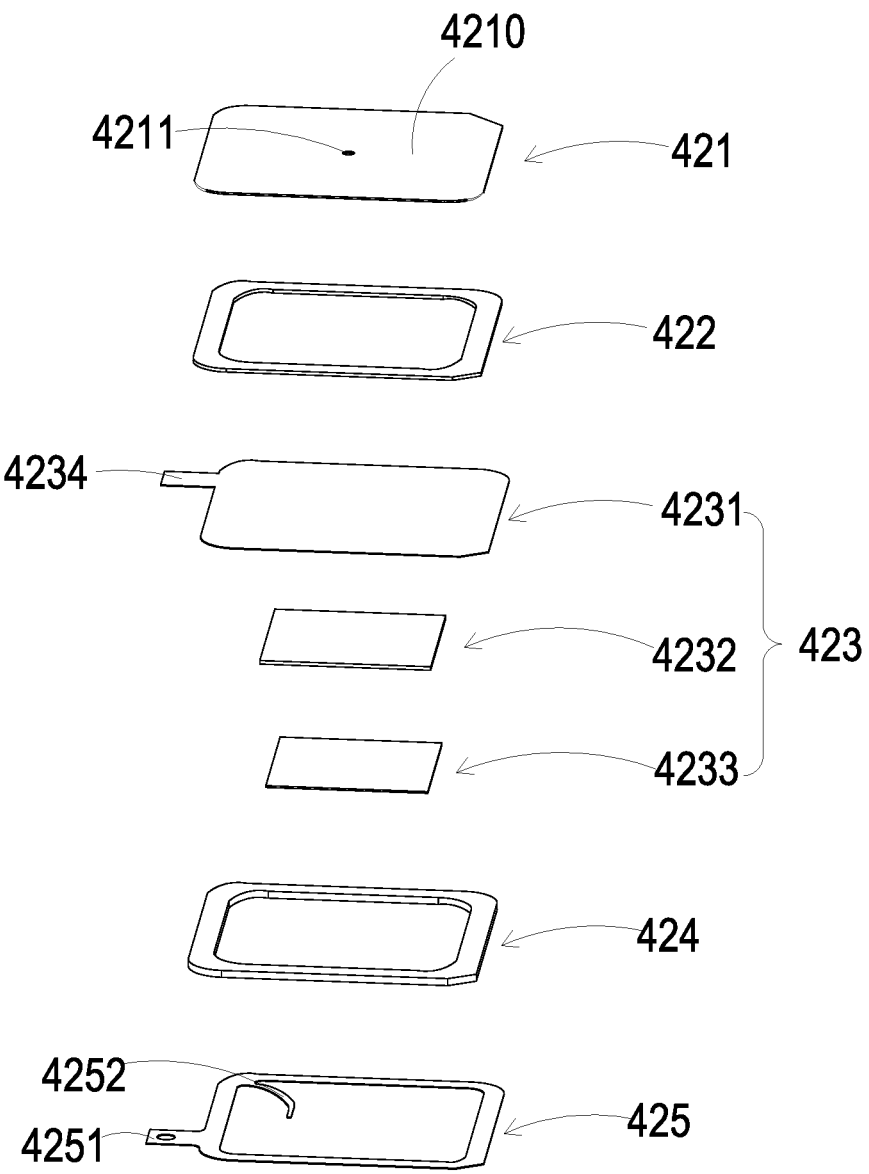
FIG. 6B is a schematic exploded view illustrating the piezoelectric actuator of the present disclosure and taken from another perspective angle.

Please refer to FIGS. 6A and 6B. In the embodiment, the piezoelectric actuator 42 includes a gas-injection plate 421, a chamber frame 422, an actuator element 423, an insulation frame 424 and a conductive frame 425. In the embodiment, the gas-injection plate 421 is made by a flexible material and includes a suspension plate 4210 and a hollow aperture 4211. The suspension plate 4210 is a sheet structure and permitted to undergo a bending deformation. Preferably but not exclusively, the shape and the size of the suspension plate 4210 are corresponding to an inner edge of the gas-guiding-component loading region 415. The shape of the suspension plate 4210 is one selected from the group consisting of a square, a circle, an ellipse, a triangle and a polygon. The hollow aperture 4211 passes through a center of the suspension plate 4210, so as to allow the gas to flow through.

In the embodiment, the chamber frame 422 is carried and stacked on the gas-injection plate 421. In addition, the shape of the chamber frame 422 is corresponding to the gas-injection plate 421. The actuator element 423 is carried and stacked on the chamber frame 422. A resonance chamber 426 is collaboratively defined by the actuator element 423, the chamber frame 422 and the suspension plate 4210 and formed among the actuator element 423, the chamber frame 422 and the suspension plate 4210. The insulation frame 424 is carried and stacked on the actuator element 423 and the appearance of the insulation frame 424 is similar to that of the chamber frame 422. The conductive frame 425 is carried and stacked on the insulation frame 424, and the appearance of the conductive frame 425 is similar to that of the insulation frame 424. In addition, the conductive frame 245 includes a conducting pin 4251 and a conducting electrode 4252. The conducting pin 4251 is extended outwardly from an outer edge of the conductive frame 425, and the conducting electrode 4252 is extended inwardly from an inner edge of the conductive frame 425. Moreover, the actuator element 423 further includes a piezoelectric carrying plate 4231, an adjusting resonance plate 4232 and a piezoelectric plate 4233. The piezoelectric carrying plate 4231 is carried and stacked on the chamber frame 422. The adjusting resonance plate 4232 is carried and stacked on the piezoelectric carrying plate 4231. The piezoelectric plate 4233 is carried and stacked on the adjusting resonance plate 4232. The adjusting resonance plate 4232 and the piezoelectric plate 4233 are accommodated in the insulation frame 424. The conducting electrode 4252 of the conductive frame 425 is electrically connected to the piezoelectric plate 4233. In the embodiment, the piezoelectric carrying plate 4231 and the adjusting resonance plate 4232 are made by a conductive material. The piezoelectric carrying plate 4231 includes a piezoelectric pin 4234. The piezoelectric pin 4234 and the conducting pin 4251 are electrically connected to a driving circuit (not shown) of the driving circuit board 43, so as to receive a driving signal, such as a driving frequency and a driving voltage. In that, a loop is formed by the piezoelectric pin 4234, the piezoelectric carrying plate 4231, the adjusting resonance plate 4232, the piezoelectric plate 4233, the conducting electrode 4252, the conductive frame 425 and the conducting pin 4251 for the driving signal. Moreover, the insulation frame 424 is insulated between the conductive frame 425 and the actuator element 423, so as to avoid the occurrence of a short circuit. Thereby, the driving signal is transmitted to the piezoelectric plate 4233. After receiving the driving signal such as the driving frequency and the driving voltage, the piezoelectric plate 4233 deforms due to the piezoelectric effect, and the piezoelectric carrying plate 4231 and the adjusting resonance plate 4232 are further driven to generate the bending deformation in the reciprocating manner.

As described above, the adjusting resonance plate 4232 is located between the piezoelectric plate 4233 and the piezoelectric carrying plate 4231 and served as a buffer between the piezoelectric plate 4233 and the piezoelectric carrying plate 4231. Thereby, the vibration frequency of the piezoelectric carrying plate 4231 is adjustable. Basically, the thickness of the adjusting resonance plate 4232 is greater than the thickness of the piezoelectric carrying plate 4231, and the thickness of the adjusting resonance plate 4232 is adjustable, thereby adjusting the vibration frequency of the actuator element 423.

Please refer to FIGS. 6A to 6C and FIG. 7A. In the embodiment, the gas-injection plate 421, the chamber frame 422, the actuator element 423, the insulation frame 424 and the conductive frame 425 are stacked and positioned in the gas-guiding-component loading region 415 sequentially, so that the piezoelectric actuator 42 is supported and positioned in the gas-guiding-component loading region 415. The bottom of the gas-injection plate 421 is fixed on the four positioning protrusions 415b of the gas-guiding-component loading region 415 for supporting and positioning, so that the suspension plate 4210 of the gas-injection plate 421 and an inner edge of the gas-guiding-component loading region 415 define a plurality of vacant space 4212 in the piezoelectric actuator 42 for gas flowing.

Figure 7A:
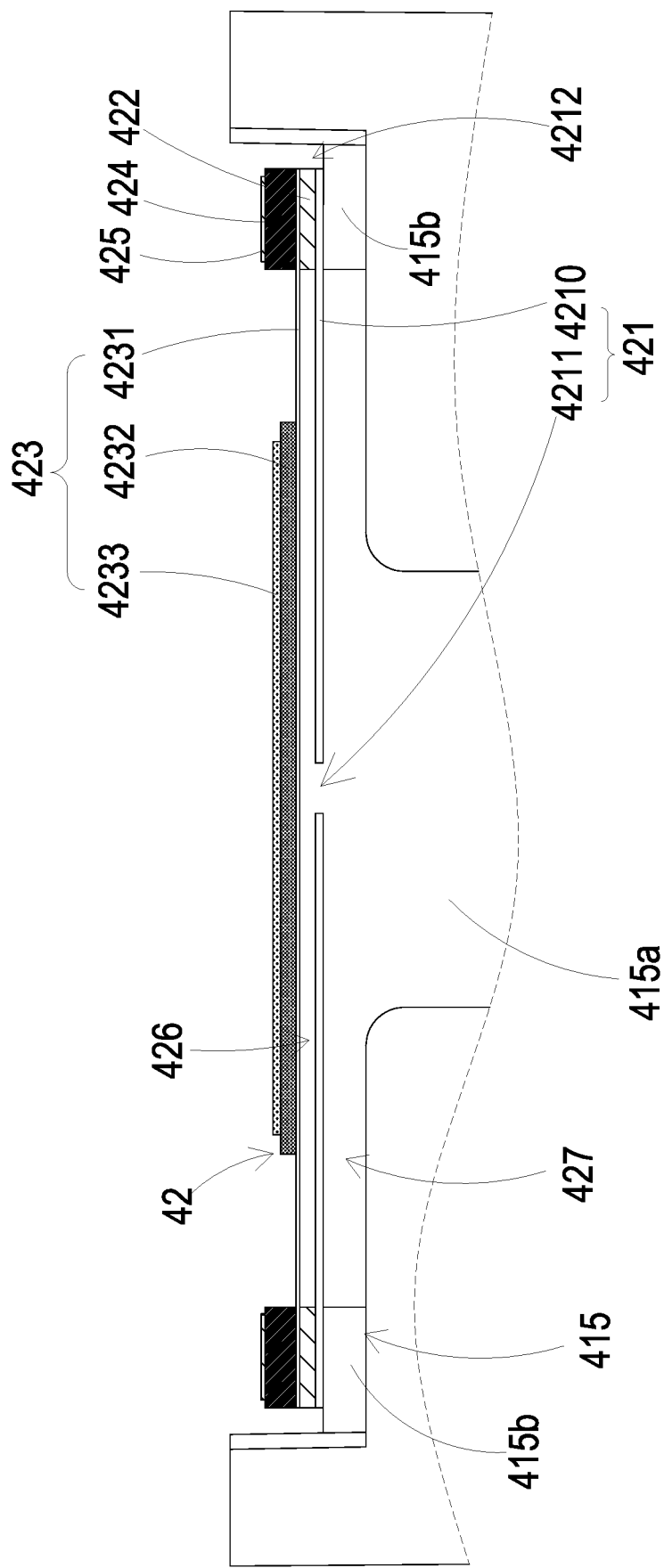
FIG. 7A is a schematic cross-sectional view illustrating the piezoelectric actuator accommodated in the gas-guiding-component loading region according to the present disclosure.

Please refer to FIG. 7A. A flowing chamber 427 is formed between the gas-injection plate 421 and the bottom surface of the gas-guiding-component loading region 415. The flowing chamber 427 is in fluid communication with the resonance chamber 426 among the actuator element 423, the chamber frame 422 and the suspension plate 4210 through the hollow aperture 4211 of the gas-injection plate 421. By controlling the vibration frequency of the gas in the resonance chamber 426 to be close to the vibration frequency of the suspension plate 4210, the Helmholtz resonance effect is generated between the resonance chamber 426 and the suspension plate 4210, and thereby the efficiency of gas transportation is improved.

Figure 7B:
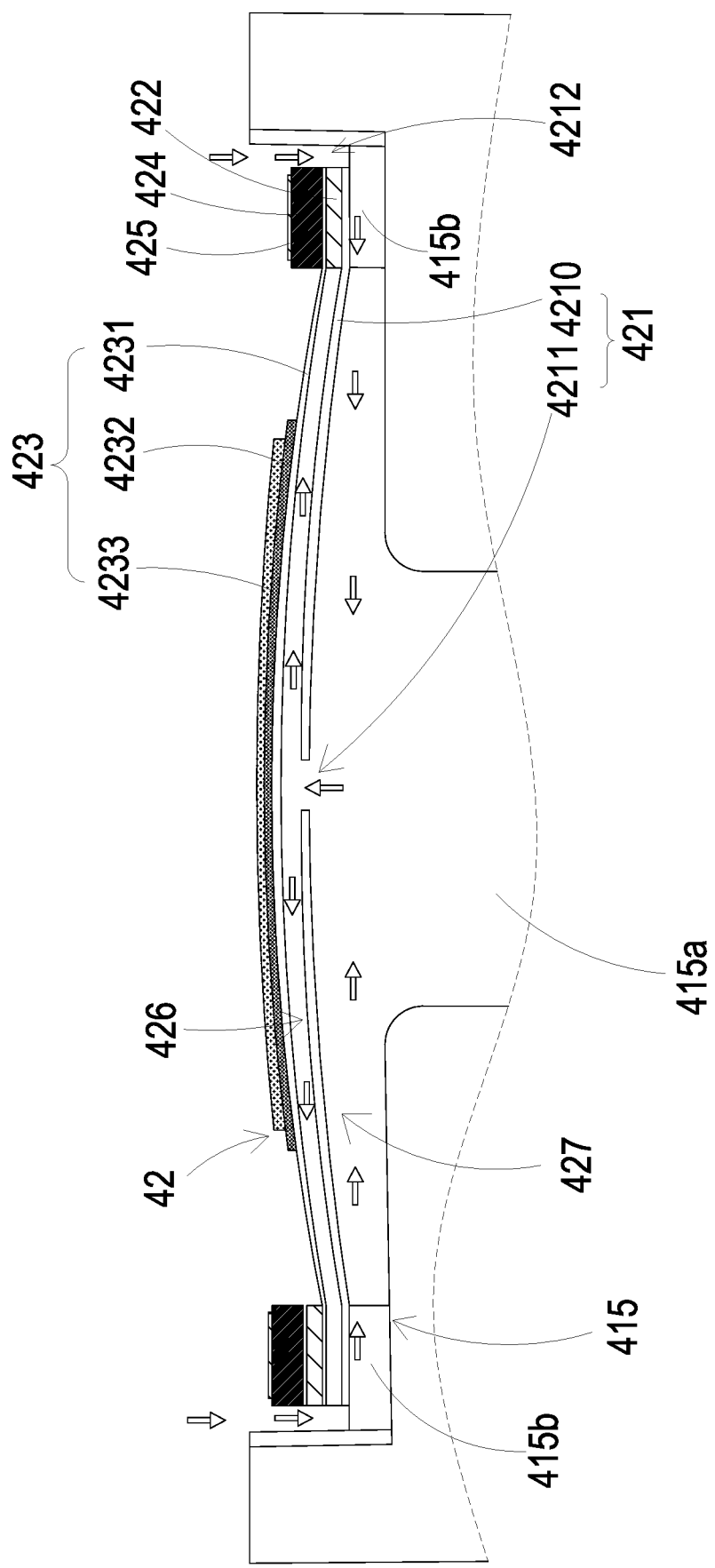
FIGS. 7B and 7C schematically illustrate the actions of the piezoelectric actuator of FIG. 7A.
Figure 7C:
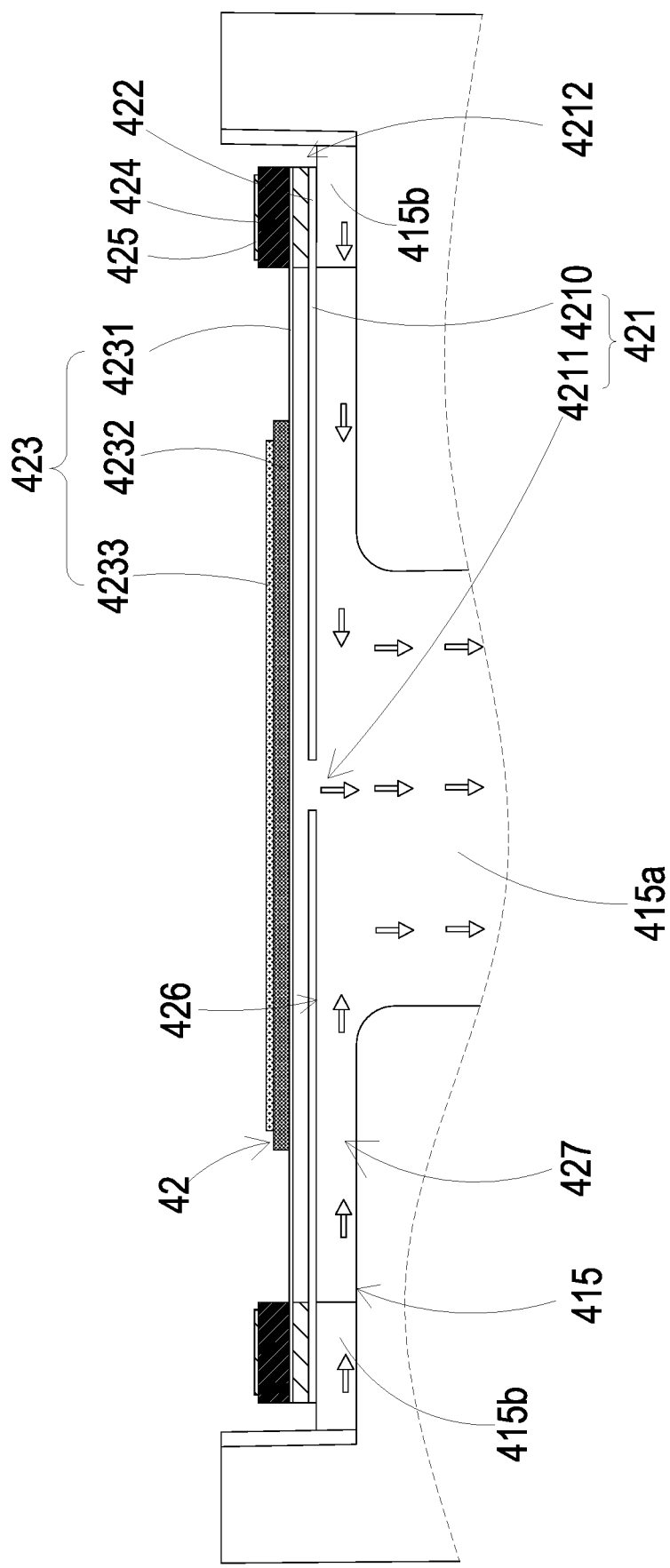

FIGS. 7B and 7C schematically illustrate the actions of the piezoelectric actuator of FIG. 7A. Please refer to FIG. 7B. When the piezoelectric plate 4233 is moved away from the bottom surface of the gas-guiding-component loading region 415, the suspension plate 4210 of the gas-injection plate 421 is driven to move away from the bottom surface of the gas-guiding-component loading region 415 by the piezoelectric plate 4233. In that, the volume of the flowing chamber 427 is expanded rapidly, the internal pressure of the flowing chamber 427 is decreased to form a negative pressure, and the gas outside the piezoelectric actuator 42 is inhaled through the vacant spaces 4212 and enters the resonance chamber 426 through the hollow aperture 4211. Consequently, the pressure in the resonance chamber 426 is increased to generate a pressure gradient. Further as shown in FIG. 7C, when the suspension plate 4210 of the gas-injection plate 421 is driven by the piezoelectric plate 4233 to move towards the bottom surface of the gas-guiding-component loading region 415, the gas in the resonance chamber 426 is discharged out rapidly through the hollow aperture 4211, and the gas in the flowing chamber 427 is compressed. In that, the converged gas close to an ideal gas state of the Benulli's law is quickly and massively ejected out of the flowing chamber 427, and transported to the ventilation hole 415a of the gas-guiding-component loading region 415. By repeating the above actions shown in FIG. 7B and FIG. 7C, the piezoelectric plate 4233 is driven to generate the bending deformation in a reciprocating manner. According to the principle of inertia, since the gas pressure inside the resonance chamber 426 after exhausting is lower than the equilibrium gas pressure, the gas is introduced into the resonance chamber 426 again. Moreover, the vibration frequency of the gas in the resonance chamber 426 is controlled to be close to the vibration frequency of the piezoelectric plate 4233, so as to generate the Helmholtz resonance effect to achieve the gas transportation at high speed and in large quantities.

Please refer to FIGS. 8A to 8C. FIGS. 8A to 8C schematically illustrate gas flowing paths of the gas detection module structure 4. Firstly, as shown in FIG. 8A, the gas is inhaled through the inlet opening 461a of the outer cover 46, flows into the gas-inlet groove 414 of the base 41 through the gas-inlet 414a, and is transported to the position of the particulate sensor 45. Further as shown in FIG. 8B, the piezoelectric actuator 42 is enabled continuously to inhale the gas in the inlet path, and it facilitates the gas to be introduced rapidly, flow stably, and be transported above the particulate sensor 45. At this time, a projecting light beam emitted from the laser component 44 passes through the transparent window 414b to irritate the suspended particles contained in the gas flowing above the particulate sensor 45 in the gas-inlet groove 414. When the suspended particles contained in the gas are irradiated to generate scattered light spots, the scattered light spots are received and calculated by the particulate sensor 45 for obtaining related information about the sizes and the concentration of the suspended particles contained in the gas. Moreover, the gas above the particle sensor 45 is continuously driven and transported by the piezoelectric actuator 42, flows into the ventilation hole 415a of the gas-guiding-component loading region 415, and is transported to the first section 416b of the gas-outlet groove 416. As shown in FIG. 8C, after the gas flows into the first section 416b of the gas-outlet groove 416, the gas is continuously transported into the first section 416b by the piezoelectric actuator 42, and the gas in the first section 416b is pushed to the second section 416c. Finally, the gas is discharged out through the gas-outlet 416a and the outlet opening 461b.

Figure 9:
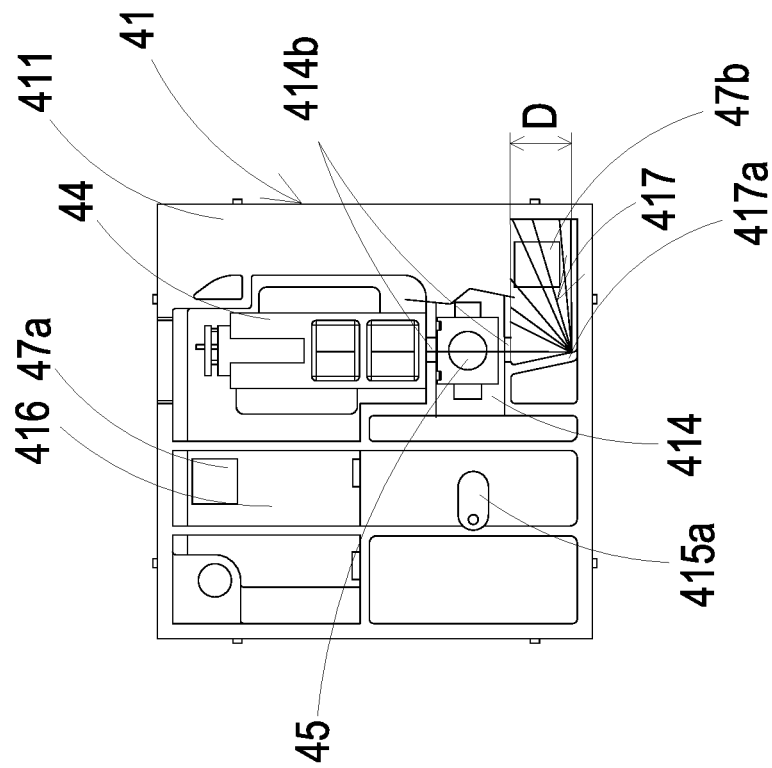
FIG. 9 schematically illustrates a light beam path emitted from the laser component of the gas detection module of the present disclosure.

As shown in FIG. 9, the base 41 further includes a light trapping region 417. The light trapping region 417 is hollowed out from the first surface 411 to the second surface 412 and spatially corresponds to the laser loading region 413. In the embodiment, the light trapping region 417 is corresponding to the transparent window 414b so that the light beam emitted by the laser component 44 is projected into the light trapping region 417. The light trapping region 417 includes a light trapping structure 417a having an oblique cone surface. The light trapping structure 417a spatially corresponds to the light beam path emitted from the laser component 44. In addition, the projecting light beam emitted from the laser component 44 is reflected into the light trapping region 417 through the oblique cone surface of the light trapping structure 417a. It prevents the projecting light beam from being reflected to the position of the particulate sensor 45. In the embodiment, a light trapping distance D is maintained between the transparent window 414b and a position where the light trapping structure 417a receives the projecting light beam. Preferably but not exclusively, the light trapping distance D is greater than 3 mm. When the light trapping distance D is less than 3 mm, the projecting light beam projected on the light trapping structure 417a is easy to be reflected back to the position of the particulate sensor 45 directly due to excessive stray light generated after reflection, and it results in distortion of detection accuracy.

Please refer to FIG. 2C and FIG. 9. The gas detection module structure 4 of the present disclosure is not only utilized to detect the suspended particles in the gas, but also further utilized to detect the characteristics of the introduced gas. Preferably but not exclusively, the gas is at least one selected from the group consisting of formaldehyde, ammonia, carbon monoxide, carbon dioxide, oxygen, ozone and a combination thereof. In the embodiment, the gas detection module structure 4 further includes a first volatile-organic-compound sensor 47a. The first volatile-organic-compound sensor 47a is positioned and disposed on the driving circuit board 43, electrically connected to the driving circuit board 43, and accommodated in the gas-outlet groove 416, so as to detect the gas flowing through the outlet path of the gas-outlet groove 416. Thus, the concentration or the characteristics of volatile organic compounds contained in the gas in the outlet path is detected. Alternatively, in an embodiment, the gas detection module structure 4 further includes a second volatile-organic-compound sensor 47b. The second volatile-organic-compound sensor 47b is positioned and disposed on the driving circuit board 43, and electrically connected to the driving circuit board 43. In the embodiment, the second volatile-organic-compound sensor 47*b* is accommodated in the light trapping region 417. Thus, the concentration or the characteristics of volatile organic compounds contained in the gas flowing through the inlet path of the gas-inlet groove 414 and transported into the light trapping region 417 through the transparent window 414*b* is detected.

From the above descriptions, the first gas detection module 13 is disposed within the remote control device 1, to detect the gas located in the indoor space 1A where the remote control device 1 is located, and provide and output the first gas detection datum, as shown in FIG. 1. When the first gas detection module 13 in the remote control device 1 detects that the air in the indoor space 1A where the remote control device 1 is located is abnormal, the remote control device 1 transmits the operating instruction through wireless transmission, and the operating instructions transmitted is received by the gas purification devices 2*a*, 2*b*, 2*c*. When, the communicator of the intelligent switch 20 of the corresponding one of the gas purification devices 2*a*, 2*b*, 2*c* receives the operating instruction, which includes the driving signal transmitted by the remote control device 1 for the gas purification devices 2*a*, 2*b*, 2*c* and the first gas detection datum detected and outputted by the first gas detection module 13, the control unit 20*b* of the intelligent switch 20 processes the operating instruction received by the communicator to control the gas purification devices 2*a*, 2*b*, 2*c*. Thus, the gas purification devices 2*a*, 2*b*, 2*c* execute the operation in the activated state and the closed state and the purification operation mode. In this way, the gas in the indoor space 1A is purified by the gas purification devices 2*a*, 2*b*, and 2*c* under the activated state, and the purification operation mode is adjusted to increase the flow rate and increase the operating time until the gas purification devices 2*a*, 2*b*, 2*c* filter the imported gas to achieve the purification effect and fit the safe range. By placing the remote control device 1 in the indoor space 1A, the user can carry the remote control device 1 anytime and anywhere to detect the air quality around him Moreover, the remote control device 1 can be further communicated with the at least one gas purification device 2*a*, 2*b*, 2*c* located in the indoor space 1A to achieve the air purification effect of the indoor space 1A. It ensures that the user can breathe the purified air. The present disclosure includes the industrial applicability and the inventive steps.

Certainly, in the first embodiment, the remote control system for gas detection and purification further includes a screen device 3 for receiving the operating instruction from the remote control device 1 and displaying the first gas detection datum detected and outputted by the first gas detection module 13. In that, the air quality in the indoor space 1A is informed. In the second embodiment, the screen device 3 receives the second gas detection datum externally transmitted from the intelligent switch 20 through wireless transmission to display the second gas detection datum informing the air quality in the indoor space 1A.

Certainly, the remote control device 1 of the remote control system for gas detection and purification in the present disclosure can be for example but not limited to a general remote control form of an electrical device. Preferably but not exclusively, the remote control device 1 is a smart speaker, which controls the operating instruction by a manned operation or a voice intelligent recognition. In an embodiment, the operating instruction is transmitted through the transmission method of the Internet of Things, to the gas purification devices 2*a*, 2*b*, 2*c* located in the indoor space 1A, so that the operation in the activated state and the closed state is executed by the gas purification devices 2*a*, 2*b*, 2*c*.

In summary, the present disclosure provides a remote control system for gas detection and purification. By constructing a gas detection module on a remote control device, the user can carry it anytime and anywhere in an indoor space to detect the air quality around him At least one gas purification device installed in the indoor space is further combined and controlled by the remote control device. Gas detection datum of the surrounding air quality is detected by the remote control device, and an operating instruction is transmitted to the gas purification device through wireless transmission to execute an operation in an activated state and a closed state and a purification operation mode. Thus, the user can breathe clean air in the indoor space. The present disclosure includes the industrial applicability and the inventive steps.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A remote control system for gas detection and purification, comprising:
   at least one remote control device comprising at least one inlet and at least one outlet, wherein the remote control device is capable of transmitting an operating instruction through wireless transmission;
   a first gas detection module disposed within the remote control device and in communication with the inlet and the outlet, and configured to detect gas located in an indoor space where the remote control device is located, wherein a first gas detection datum measured by the first gas detection module is provided and outputted to the remote control device, and the operating instruction and the first gas detection datum are transmitted by the remote control device; and
   at least one gas purification device disposed in the indoor space and receiving the operating instruction and the first gas detection datum from the remote control device, and configured to execute an operation in an activated state and a closed state, wherein the gas in the indoor space is purified under the activated state, and the first gas detection datum is received to adjust a purification operation mode, wherein the gas purification device comprises an intelligent switch and a second gas detection module, the second gas detection module detects gas located in a place where the gas purification device is located, and provides a second gas detection datum, wherein the second gas detection datum detected and outputted by the second gas detection module is transmitted to an external connection device through wireless transmission, wherein the external connection device is capable of transmitting the second gas detection datum to a cloud device for storing thereof and generating gas detection information and an alarm.

2. The remote control system for gas detection and purification according to claim 1, wherein the wireless communication transmission is one selected from the group consisting of an infrared transmission, a radio frequency identification transmission, Wi-Fi transmission, Bluetooth transmission and a near field communication (NFC) transmission.

3. The remote control system for gas detection and purification according to claim 1, wherein the gas purification device is an air conditioner.

4. The remote control system for gas detection and purification according to claim 1, wherein the gas purification device is an air purifier.

5. The remote control system for gas detection and purification according to claim 1, wherein the gas purification device is a total heat exchanger.

6. The remote control system for gas detection and purification according to claim 1, wherein the gas purification device is a fresh air ventilator.

7. The remote control system for gas detection and purification according to claim 1, wherein the intelligent switch comprises a second communicator and a control unit, wherein the second communicator receives the operating instruction and the first gas detection datum externally transmitted by the remote control device, the control unit processes the operating instruction and the first gas detection datum received by the second communicator to control the gas purification device to execute the operation in the activated state and the closed state and the purification operation mode.

8. The remote control system for gas detection and purification according to claim 1, wherein the external connection device is a portable mobile device.

9. The remote control system for gas detection and purification according to claim 8, further comprising a screen device receiving the operating instruction and the first gas detection datum from the remote control device to display the first gas detection datum informing the air quality in the indoor space, and receiving the second gas detection datum externally transmitted from the intelligent switch through wireless transmission to display the second gas detection datum informing the air quality in the indoor space.

10. The remote control system for gas detection and purification according to claim 1, wherein the second gas detection module has a gas detection module structure similar to that of the first gas detection module.

11. The remote control system for gas detection and purification according to claim 10, wherein the gas detection module structure comprises:
a base comprising:
a first surface;
a second surface opposite to the first surface;
a laser loading region hollowed out from the first surface to the second surface;
a gas-inlet groove concavely formed from the second surface and disposed adjacent to the laser loading region, wherein the gas-inlet groove comprises a gas-inlet and two lateral walls, the gas-inlet is in communication with an environment outside the base, and a transparent window is opened on the two lateral walls and is in communication with the laser loading region;
a gas-guiding-component loading region concavely formed from the second surface and in communication with the gas-inlet groove, wherein a ventilation hole penetrates a bottom surface of the gas-guiding-component loading region, and the gas-guiding-component loading region has four positioning protrusions disposed at four corners thereof; and
a gas-outlet groove concavely formed from the first surface, spatially corresponding to the bottom surface of the gas-guiding-component loading region, and hollowed out from the first surface to the second surface in a region where the first surface is not aligned with the gas-guiding-component loading region, wherein the gas-outlet groove is in communication with the ventilation hole, and a gas-outlet is disposed in the gas-outlet groove and in communication with the environment outside the base;
a piezoelectric actuator accommodated in the gas-guiding-component loading region;
a driving circuit board covering and attached to the second surface of the base;
a laser component positioned and disposed on the driving circuit board, electrically connected to the driving circuit board, and accommodated in the laser loading region, wherein a light beam path emitted from the laser component passes through the transparent window and extends in a direction perpendicular to the gas-inlet groove, thereby forming an orthogonal direction with the gas-inlet groove;
a particulate sensor positioned and disposed on the driving circuit board, electrically connected to the driving circuit board, and disposed at an orthogonal position where the gas-inlet groove intersects the light beam path of the laser component in the orthogonal direction, so that suspended particles passing through the gas-inlet groove and irradiated by a projecting light beam emitted from the laser component are detected; and
an outer cover covering the first surface of the base and comprising a side plate, wherein the side plate has an inlet opening spatially corresponding to the gas-inlet and an outlet opening spatially corresponding to the gas-outlet, respectively,
wherein the first surface of the base is covered with the outer cover, and the second surface of the base is covered with the driving circuit board, so that an inlet path is defined by the gas-inlet groove, and an outlet path is defined by the gas-outlet groove, so that the gas is inhaled from the environment outside base by the piezoelectric actuator, transported into the inlet path defined by the gas-inlet groove through the inlet opening, and passes through the particulate sensor to detect the concentration of the suspended particles contained in the gas, and the gas transported through the piezoelectric actuator is transported out of the outlet path defined by the gas-outlet groove through the ventilation hole and then discharged through the outlet opening.

12. The remote control system for gas detection and purification according to claim 11, wherein the inlet opening of the outer cover spatially corresponds to the inlet of the remote control device, and the outlet opening of the outer cover spatially corresponds to the outlet of the remote control device, so that the gas located at where the remote control device is located is introduced from the inlet through the inlet opening into the first gas detection module for detection, and then discharged from the outlet opening and discharged through the outlet of the remote control device.

13. The remote control system for gas detection and purification according to claim 11, wherein the base comprises a light trapping region hollowed out from the first surface to the second surface and spatially corresponding to the laser loading region, wherein the light trapping region comprises a light trapping structure having an oblique cone surface and spatially corresponding to the light beam path, wherein a light trapping distance is maintained between the transparent window and a position where the light trapping structure receives the projecting light beam, wherein the light trapping distance is greater than 3 mm.

14. The remote control system for gas detection and purification according to claim 11, wherein the particulate sensor is a PM2.5 sensor.

15. The remote control system for gas detection and purification according to claim 11, wherein the piezoelectric actuator comprises:
- a gas-injection plate comprising a suspension plate and a hollow aperture, wherein the suspension plate is permitted to undergo a bending deformation, and the hollow aperture is formed at a center of the suspension plate;
- a chamber frame carried and stacked on the suspension plate;
- an actuator element carried and stacked on the chamber frame for being driven in response to an applied voltage to undergo the bending deformation in a reciprocating manner, wherein the actuator element comprises:
- a piezoelectric carrying plate carried and stacked on the chamber frame;
- an adjusting resonance plate carried and stacked on the piezoelectric carrying plate; and
- a piezoelectric plate carried and stacked on the adjusting resonance plate, wherein the piezoelectric plate is configured to drive the piezoelectric carrying plate and the adjusting resonance plate to generate the bending deformation in the reciprocating manner by the applied voltage;
- an insulation frame carried and stacked on the actuator element; and
- a conductive frame carried and stacked on the insulation frame,
- wherein the gas-injection plate is fixed on the four positioning protrusions of the gas-guiding-component loading region for supporting and positioning, so that the gas-injection plate and an inner edge of the gas-guiding-component loading region define a plurality of vacant space for gas flowing, a flowing chamber is formed between the gas-injection plate and the bottom surface of the gas-guiding-component loading region, a resonance chamber is formed among the actuator element, the chamber frame and the suspension plate, wherein when the actuator element is enabled to drive the gas-injection plate to move in resonance, the suspension plate of the gas-injection plate is driven to generate the bending deformation in a reciprocating manner, the gas is inhaled through the vacant space, flows into the flowing chamber, and is discharged out, so as to achieve gas transportation.

16. The remote control system for gas detection and purification according to claim 11, further comprising a first volatile-organic-compound sensor positioned and disposed on the driving circuit board, electrically connected to the driving circuit board, and accommodated in the gas-outlet groove, so as to detect the gas flowing through the outlet path of the gas-outlet groove.

17. The remote control system for gas detection and purification according to claim 13, further comprising a second volatile-organic-compound sensor positioned and disposed on the driving circuit board, electrically connected to the driving circuit board, and accommodated in the light trapping region, so as to detect the gas flowing through the inlet path of the gas-inlet groove and transported into the light trapping region through the transparent window.

18. The remote control system for gas detection and purification according to claim 1, wherein the remote control device is a smart speaker, which controls the operating instruction by a manned operation or a voice intelligent recognition.

19. A remote control system for gas detection and purification, comprising:
- at least one remote control device comprising an external port;
- an external gas detection module comprising a housing, a first gas detection module, a control unit and an external connection device, and connected with the external port of the remote control device, wherein an external power is connected to actuate the first gas detection module, so that the first gas detection module detects gas located in an indoor space where the remote control device is located to generate a first gas detection datum, and the control unit transmits an operating instruction and the first gas detection datum through wireless transmission; and
- at least one gas purification device disposed in the indoor space and receiving the operating instruction and the first gas detection datum from the control unit, and configured to execute an operation in an activated state and a closed state, wherein the gas in the indoor space is purified under the activated state, and the first gas detection datum is received to adjust a purification operation mode.

* * * * *